(12) United States Patent
Shirai et al.

(10) Patent No.: US 8,138,646 B2
(45) Date of Patent: Mar. 20, 2012

(54) ROTATABLE SHAFT ASSEMBLING METHOD, ROTATABLE SHAFT ASSEMBLY, AND ELECTRIC MOTOR HAVING THE SAME

(75) Inventors: Nakatsune Shirai, Iwata (JP); Hidenori Ishihara, Hamamatsu (JP); Tomoki Yamashita, Hamamatsu (JP); Hiroaki Yamamoto, Toyohashi (JP); Katsumi Endo, Kosai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 644 days.

(21) Appl. No.: 12/314,715

(22) Filed: Dec. 16, 2008

(65) Prior Publication Data
US 2009/0195099 A1 Aug. 6, 2009

(30) Foreign Application Priority Data
Feb. 6, 2008 (JP) ................................ 2008-026727

(51) Int. Cl.
*H02K 7/116* (2006.01)
*F16H 1/16* (2006.01)

(52) U.S. Cl. ............ 310/90; 310/83; 29/596; 29/898.07
(58) Field of Classification Search .................... 310/83, 310/90; 29/596, 898.042, 898.07, 898.11, 29/898.12; 384/295, 428, 438
See application file for complete search history.

(56) References Cited

U.S. PATENT DOCUMENTS
6,044,723 A * 4/2000 Eda et al. .................. 74/388 PS
6,688,774 B2 * 2/2004 Kullin et al. .................. 384/539

FOREIGN PATENT DOCUMENTS
JP  A-2002-115716  4/2002
* cited by examiner

*Primary Examiner* — Quyen Leung
*Assistant Examiner* — David Scheuermann
(74) *Attorney, Agent, or Firm* — Posz Law Group, PLC

(57) ABSTRACT

At the time of assembling an electric motor, plain bearings are installed over a worm shaft to form a shaft assembly. Then, the worm shaft together with the plain bearings is inserted into a gear housing in an inserting direction, which is generally parallel to an axial direction of the worm shaft, such that each of the plain bearings is press fitted into a corresponding installation part of the housing.

5 Claims, 4 Drawing Sheets

WINDOW ECU 40

ROTATABLE SHAFT ASSEMBLING METHOD, ROTATABLE SHAFT ASSEMBLY, AND ELECTRIC MOTOR HAVING THE SAME

CROSS REFERENCE TO RELATED APPLICATION

This application is based on and incorporates herein by reference Japanese Patent Application No. 2008-26727 filed on Feb. 6, 2008 and Japanese Patent Application No. 2008-284600 filed on Nov. 5, 2008.

BACKGROUND OF THE INVENTION

1. Field of the Invention

The present invention relates to a rotatable shaft assembling method, a rotatable shaft assembly and an electric motor having the rotatable shaft assembly.

2. Description of Related Art

For example, Japanese Unexamined Patent Publication No. JP2002-115716A discloses an electric motor having a speed reducing mechanism. Specifically, a worm gear mechanism, which serves as the speed reducing mechanism, is received in a gear housing, and a worm shaft (a rotatable shaft) of the worm gear mechanism is connected to a motor shaft, which is rotated upon driving of a motor main body. The worm shaft is rotatably supported by the gear housing through two bearings (metal plain bearings), which are spaced from each other by a predetermined distance. In the assembling method of the above worm shaft, the bearings are respectively installed into the gear housing, and then the worm shaft is installed into the gear housing and is supported by the bearings. Furthermore, thrust adjustment of the worm shaft is executed after assembling of the gear housing to the motor main body.

However, in the case of the previous assembling method of the worm shaft, the step of installing the first bearing to the gear housing and the subsequent step of installing the second bearing to the gear housing are executed first, and then the step of installing the worm shaft is executed. In such a case, the individual components are separately installed to cause an increase in the number of assembling steps. Furthermore, the assembling requires two kinds of jigs, i.e., the jig for installing the bearing and the jig for installing the worm shaft.

SUMMARY OF THE INVENTION

The present invention addresses at least one of the above disadvantages.

According to the present invention, there is provided a rotatable shaft assembling method. In the method, at least one plain bearing is installed over a rotatable shaft. Then, the rotatable shaft is inserted together with the at least one plain bearing into a housing in a predetermined inserting direction, which is generally parallel to an axial direction of the rotatable shaft, such that the at least one plain bearing is respectively press fitted into at least one installation part of the housing.

There is also provided a rotatable shaft assembly that is adapted to be installed in a housing. The rotatable shaft assembly includes a rotatable shaft, a plain bearing and a pressing and supporting element. The plain bearing is installed over the rotatable shaft and rotatably supports the rotatable shaft. The pressing and supporting element is provided to the rotatable shaft to move integrally with the rotatable shaft and is adapted to press fit the plain bearing into an installation part of the housing in a predetermined inserting direction of the rotatable shaft, which is generally parallel to an axial direction of the rotatable shaft, at a time of inserting the rotatable shaft into the housing.

There is also provided an electric motor that includes a motor main body and a speed reducing unit. The motor main body includes a yoke housing and an armature. The armature is received in the yoke housing and has a motor shaft. The speed reducing unit includes a gear housing and the rotatable shaft assembly described above. The gear housing is joined to the yoke housing. The rotatable shaft assembly is received in the gear housing, and the rotatable shaft is a worm shaft, which has a worm and is connected to the motor shaft.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

Figure 1:
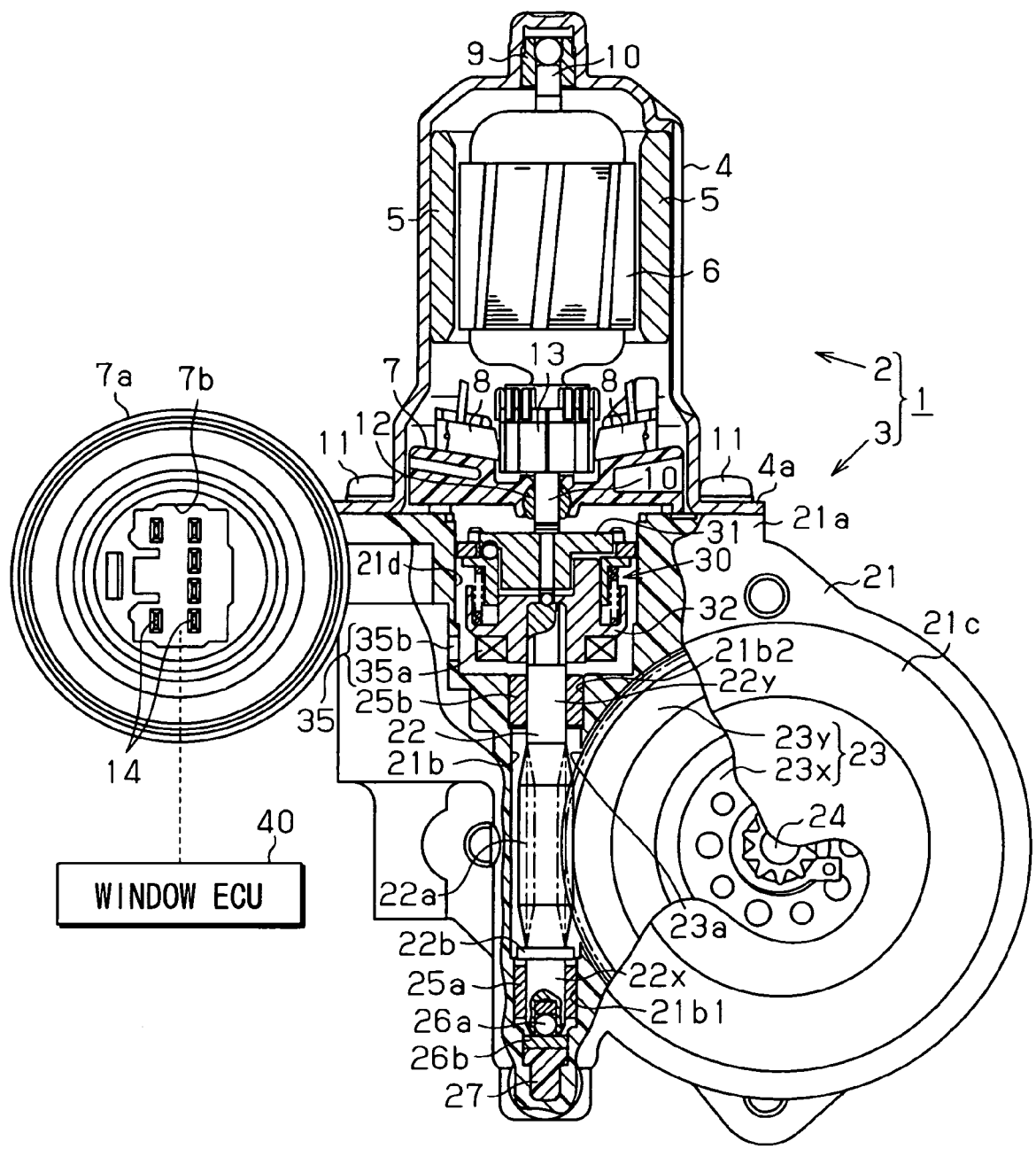
FIG. 1 is a cross sectional view showing a motor according to an embodiment of the present invention.

FIG. 1 is a partially fragmented view of an electric motor 1 of the present embodiment. The motor 1 of the present embodiment is a power window motor, which drives a window glass of a vehicle to open and close the same. The motor 1 includes a motor main body 2 and a speed reducing unit 3.

The motor main body 2 includes a yoke housing 4, two magnets 5, an armature 6 a brush holder 7 and two power supply brushes 8. The yoke housing 4 is configured into a generally planar cup shaped body. The magnets 5 are fixed to an inner peripheral surface of the yoke housing 4. A bearing 9 is provided at a bottom center of the yoke housing 4 and rotatably supports a proximal end portion of a motor shaft 10 of the armature 6.

The yoke housing 4 has an opening 4a, which includes attachment pieces and is fixed to an opening 21a of the gear housing 21 with screws 11. At the time of this fixing process, the brush holder 7 is clamped between the opening 4a of the yoke housing 4 and the opening 21a of the gear housing 21.

The brush holder 7 holds a bearing 12 and the brushes 8. In the yoke housing 4, the bearing 12 rotatably supports the distal end portion of the motor shaft 10 of the armature 6, and the brushes 8 are slidably engaged with a commutator 13, which is fixed to the motor shaft 10. A portion of the brush holder 7, which laterally projects at a location between the yoke housing 4 and the gear housing 21, is a connector 7a. The connector 7a is connected to a vehicle body side connector (not shown), which extends from a vehicle body side. Terminals 14 are exposed in a recess of the connector 7a. The terminals 14 are insert molded in the brush holder 7 and are electrically connected to, for example, the brushes 8 and a rotation sensor 35 (one or more Hall elements 35b) provided in the motor 1. When the connector 7a is connected to the vehicle body side connector, the motor 1 is electrically connected to a window electric control unit (ECU) 40, which is provided in the vehicle body side, to provide an electric power supply to the motor 1 and to output sensor signals from the motor 1.

The speed reducing unit 3 includes the gear housing 21, a worm shaft 22, a worm wheel 23, an output shaft 24 and a brake mechanism 30.

The gear housing 21 is made of resin and receives the worm shaft 22, the worm wheel 23 and the brake mechanism 30. The gear housing 21 has the opening 21a, which is axially opposed to the opening 4a of the yoke housing 4. The brush holder 7 is interposed between the opening 4a of the yoke housing 4 and the opening 21a of the gear housing 21.

The gear housing 21 includes a generally cylindrical shaft receiving tubular portion 21b, a wheel receiving portion 21c and a brake receiving portion 21d. The shaft receiving tubular portion 21b axially extends from the opening 21a of the gear housing 21 and receives the worm shaft 22. The wheel receiving portion 21c is communicated with the shaft receiving tubular portion 21b and receives the worm wheel 23. The brake receiving portion 21d is provided at a proximal end portion (a motor main body 2 side end portion) of the shaft receiving tubular portion 21b and receives the brake mechanism 30.

A distal side bearing (also referred to as a first plain bearing) 25a is installed to a distal side installation part (also referred to as a first installation part) 21b1 at a distal end part of the shaft receiving tubular portion 21b, and a proximal side bearing (also referred to as a second plain bearing) 25b is installed to a proximal side installation part (also referred to as a second installation part) 21b2 at a proximal end part of the shaft receiving tubular portion 21b. The bearings 25a, 25b are formed as metal plain bearings, respectively. A distal end portion (also referred to as a first end portion) and a proximal end portion (also referred to as a second end portion) of the worm shaft 22 are rotatably supported by the bearings 25a, 25b in such a manner that the worm shaft 22 is coaxial with the motor shaft 10 in the shaft receiving tubular portion 21b. A worm 22a is formed in an axial center portion of the worm shaft 22 (a portion of the worm shaft 22 between supporting shaft portions 22x, 22y of the worm shaft 22, which are supported by the bearings 25a, 25b, respectively) and is meshed with the worm wheel 23. An annular pressing and supporting element (also referred to as a first pressing and supporting element) 22b is formed as an annular flange that is formed integrally in a portion of the worm shaft 22, which is located between the distal side supporting shaft portion 22x and the worm 22a. The pressing and supporting element 22b serves as a jig (described later), which is used to install the distal side bearing 25a to the installation part 21b1.

A thrust receiving ball 26a and a thrust receiving plate 26b, which receive a thrust load of the worm shaft 22, are provided at the distal end of the worm shaft 22. Thrust adjusting resin 27 is filled and is solidified at the distal end part of the shaft receiving tubular portion 21b on the opposite side of the thrust receiving plate 26b, which is opposite from the worm shaft 22, to implement thrust adjustment for reducing a rattling movement (a play) of the worm shaft 22, the brake mechanism 30 and the motor shaft 10 in the thrust direction.

The worm wheel 23, which is meshed with the worm 22a of the worm shaft 22, is rotatably received in the wheel receiving portion 21c. The worm wheel 23 is formed by integrally molding a resin gear portion 23y to an outer peripheral part of a metal reinforcing plate 23x. A toothed part 23a, which includes teeth to be meshed with the worm 22a of the worm shaft 22, is formed in an outer peripheral part of the resin gear portion 23y. The output shaft 24 is connected to a center portion of the reinforcing plate 23x to rotate integrally with the reinforcing plate 23x. The output shaft 24 is connected to and drives a window regulator, which drives the window glass to open or close the window glass.

The brake mechanism 30 is received in the brake receiving portion 21d and is interposed between the worm shaft 22 and the motor shaft 10. The brake mechanism 30 includes a driving-side rotator 31 and a driven-side rotator 32. The driving-side rotator 31 is connected to the motor shaft 10 and is rotated integrally with the motor shaft 10. The driven-side rotator 32 is connected to the worm shaft 22 and is rotated integrally with the worm shaft 22. The brake mechanism 30 is operated as follows. That is, the driven-side rotator 32 is engaged with the driving-side rotator 31 in the rotational direction of the driving-side rotator 31 at the time of rotating the motor shaft 10 through driving of the motor main body 2, so that the brake mechanism 30 conducts the rotational force of the motor shaft 10 from the driving-side rotator 31 to the driven-side rotator 32. In contrast, when the rotational force from the output shaft 24 is conducted to the driven-side rotator 32 through the worm wheel 23 and the worm shaft 22, the brake mechanism 30 exerts a brake force to limit the rotation of the driven-side rotator 32.

Specifically, when the motor main body 2 is driven to rotate the motor shaft 10 upon generation of a command to automatically open or close the window glass, the brake mechanism 30 conducts the rotation of the motor shaft 10 from the driving-side rotator 31 to the driven-side rotator 32. Then, the output shaft 24 is rotated through the worm shaft 22 and the worm wheel 23 upon the rotation of the driven-side rotator 32, so that the window regulator is driven through the rotation of the output shaft 24 to open or close the window glass.

In contrast, the rotational force may be applied to the output shaft 24 by the weight of the window glass, by the vibrations of the window glass generated during the driving of the vehicle or by the forceful manual opening or closing of the window glass. When the rotational force from the output shaft 24 is conducted to the driven-side rotator 32 of the brake mechanism 30 through the worm wheel 23 and the worm shaft 22, the brake force is exerted in the driven-side rotator 32 at the brake mechanism 30 to limit the rotation of the driven-side rotator 32. That is, when the external rotational force is applied to the output shaft 24, the rotation of the output shaft 24 is locked by the brake mechanism 30. In this way, it is possible to limit unintentional falling of the window glass, and it is also possible to limit the unauthorized opening movement of the window glass and thereby to prevent stealing of the vehicle.

Furthermore, an annular (ring-shaped) sensor magnet 35a, which is magnetized to have multiple poles arranged one after another in the circumferential direction, is installed to the driven-side rotator 32 of the brake mechanism 30 to rotate integrally with the driven-side rotator 32. The Hall element(s) 35b is installed to a part of the brake receiving portion 21d, which is radially opposed to the sensor magnet 35a, to sense a change in the magnetic field caused by the rotation of the sensor magnet 35a. That is, the rotation sensor 35 is formed by the sensor magnet 35a and the Hall element(s) 35b to sense the rotation information, such as the rotational direction and the number of rotations per unit time, of the driven-side rotator 32 (i.e., of the output shaft 24). A measurement signal, which indicates the measured rotation information, is outputted to the window ECU 40 through the connector 7a.

The window ECU 40 recognizes the rotation information of the driven-side rotator 32 (the output shaft 24) based on the measurement signal received from the rotation sensor 35 and recognizes, i.e., determines the operational position (opening/closing position) of the window glass, the moving direction (opening/closing direction) of the window glass and the moving speed (opening/closing speed) of the window glass. Then, the window ECU 40 executes an opening/closing control operation to control the rotation of the motor main body 2 to open or close the window glass in a normal manner based on, for example, the operational position (the opening/closing position) and the moving speed (the opening/closing speed) of the window glass. Furthermore, the window ECU 40 executes a clamping limiting control operation. Specifically, the window ECU 40 senses clamping of a foreign object (e.g., a passenger's hand) by the window glass based on the operational position (the opening/closing position) of the window glass, the moving direction (the opening/closing direction) of the window glass, and the moving speed (the opening/closing speed) of the window glass. When the window ECU 40 senses and determines that the foreign object is clamped by the window glass, the window ECU 40 reverses the rotational direction of the motor main body 2 to lower (i.e., to open) the window glass, so that the clamped object is released from the window glass.

Next, the assembling method of the worm shaft 22 to the gear housing 21 will be described with reference to FIGS. 2 to 4.

Figure 2:
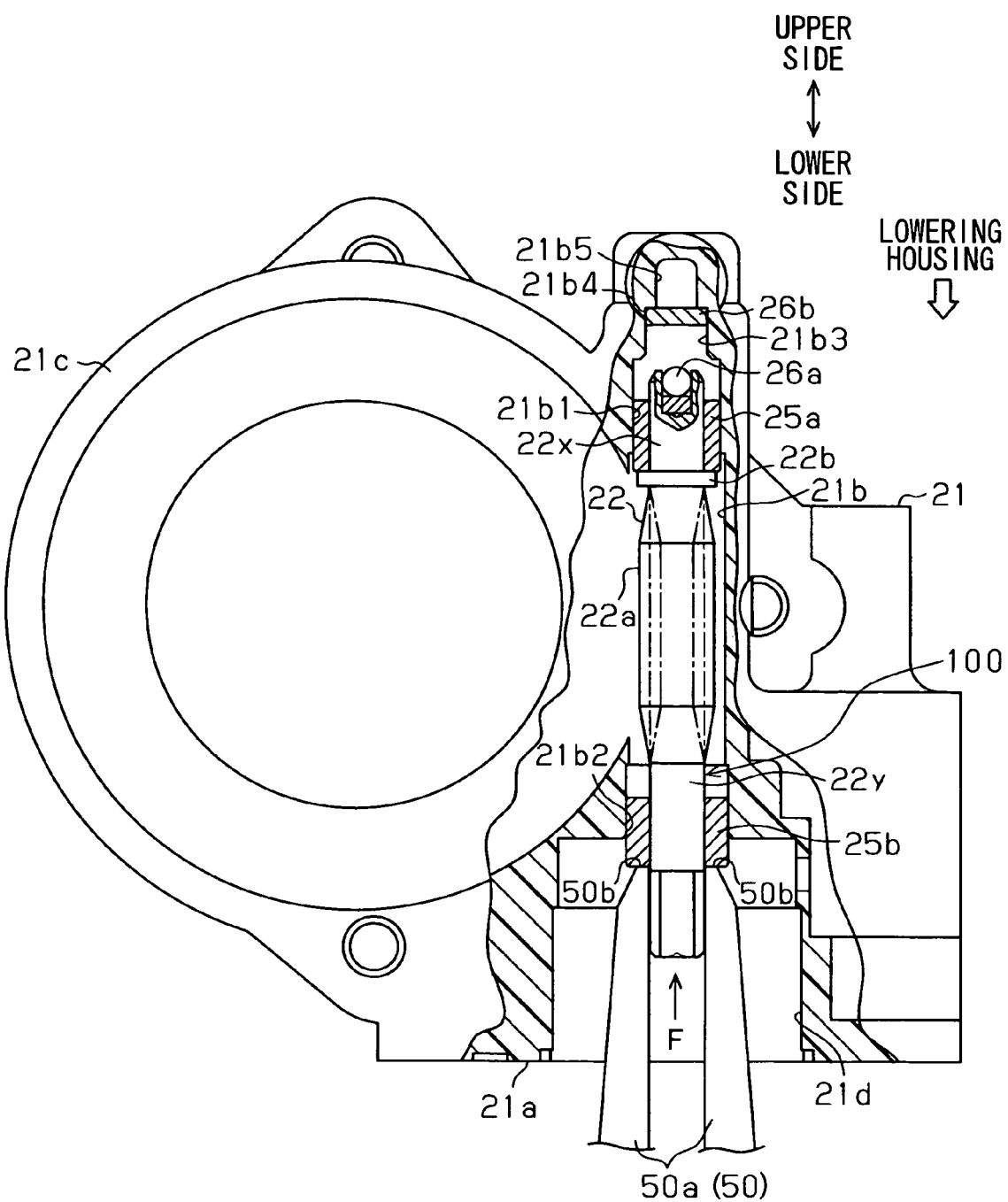
FIG. 2 is a schematic view showing an assembling method of a worm shaft of the motor according to the embodiment.

As shown in FIG. 2, an assembling jig 50, which has two clamping arms 50a to clamp the outer peripheral surface of the proximal end portion (the lower end portion in FIG. 2) of the worm shaft 22, is used for the assembling of the worm shaft 22 to the gear housing 21. A distal end surface of each clamping arm 50a forms a pressing and supporting element (also referred to as a second pressing and supporting element) 50b, which contacts and presses the proximal side bearing 25b.

First, the supporting shaft portion 22y of the worm shaft 22 is inserted into the bearing 25b, and the proximal end portion of the worm shaft 22 is clamped by the clamping arms 50a such that the distal end portion of the worm shaft 22 is directed upward. At this time, the bearing 25b is placed on the pressing and supporting elements 50b at the distal ends of the clamping arms 50a. Furthermore, the distal side supporting shaft portion 22x of the worm shaft 22 is inserted into the distal side bearing 25a, and the distal side bearing 25a is placed on the pressing and supporting element 22b formed at the distal end portion of the worm shaft 22.

Here, a plate holding portion 21b3 is formed at the distal end part of the shaft receiving tubular portion 21b of the gear housing 21 in a location that is on the distal end side of the distal side installation part 21b1. A positioning step 21b4 is formed on the distal end side of the plate holding portion 21b3, and a resin fill chamber 21b5 is formed on the distal end side of the positioning step 21b4. The thrust receiving plate 26b is previously held in the plate holding portion 21b3 before the installation of the worm shaft 22 into the shaft receiving tubular portion 21b. In this case, the thrust receiving plate 26b is engaged with the positioning step 21b4 and is positioned thereto. The thrust receiving plate 26b is held such that the thrust receiving plate 26b does not fall even when the opening 21a of the gear housing 21 is oriented downward. At the time of filling the thrust adjusting resin 27, the thrust receiving plate 26b is immovably held in place by the filling pressure of the thrust adjusting resin 27.

Next, the worm shaft 22, to which the bearings 25a, 25b are installed, is placed such that the distal end portion of the worm shaft 22 is oriented upward, and then the gear housing 21 is held by an assembling device (not shown) and is placed above the worm shaft 22. Here, the worm shaft 22, to which the bearings 25a, 25b are installed, serves as a shaft assembly (also referred to as a rotatable shaft assembly) 100. Thereafter, the gear housing 21 is lowered while the opening 21a is oriented downward, so that the worm shaft 22 (specifically, the shaft assembly 100) is inserted into the shaft receiving tubular portion 21b of the gear housing 21 trough the opening 21a of the gear housing 21 in the inserting direction F. At this time, the distal side supporting shaft portion (also referred to as the distal end portion or the first end portion) 22x of the worm shaft 22 is located at a front side of the worm shaft 22 in the inserting direction F while the proximal side supporting shaft portion 22y (also referred to as the proximal end portion or the second end portion) 22y of the worm shaft 22 is located at a rear side of the worm shaft 22 in the inserting direction F. In this case, the outer diameter of the distal side bearing 25a is set to be smaller than the outer diameter of the proximal side bearing 25b to ease the installation of the worm shaft 22. At the time of installing the worm shaft 22 into the shaft receiving tubular portion 21b, the bearings 25a, 25b receive the pressing force (a reaction force caused by the lowering of the gear housing 21) from the pressing and supporting element 22b of the worm shaft 22 and the pressing and supporting elements 50b of the clamping arms 50a, respectively. Thereby, the bearings 25a, 25b are press fitted into the installation parts 21b1, 21b2, respectively, of the shaft receiving tubular portion 21b. Here, it should be understood that although the outer diameter of the distal side bearing 25a is set to be smaller than the outer diameter of the proximal side bearing 25b in the present embodiment, the outer diameter of the distal side bearing 25a may be set to be the same as the outer diameter of the proximal side bearing 25b. In other words, the same type of bearings may be used as the distal side bearing 25a and the proximal side bearing 25b, if desired. In such a case, it is only required to have the one type of bearings rather than the two types of bearings, so that the manufacturing costs can be reduced.

Figure 3:
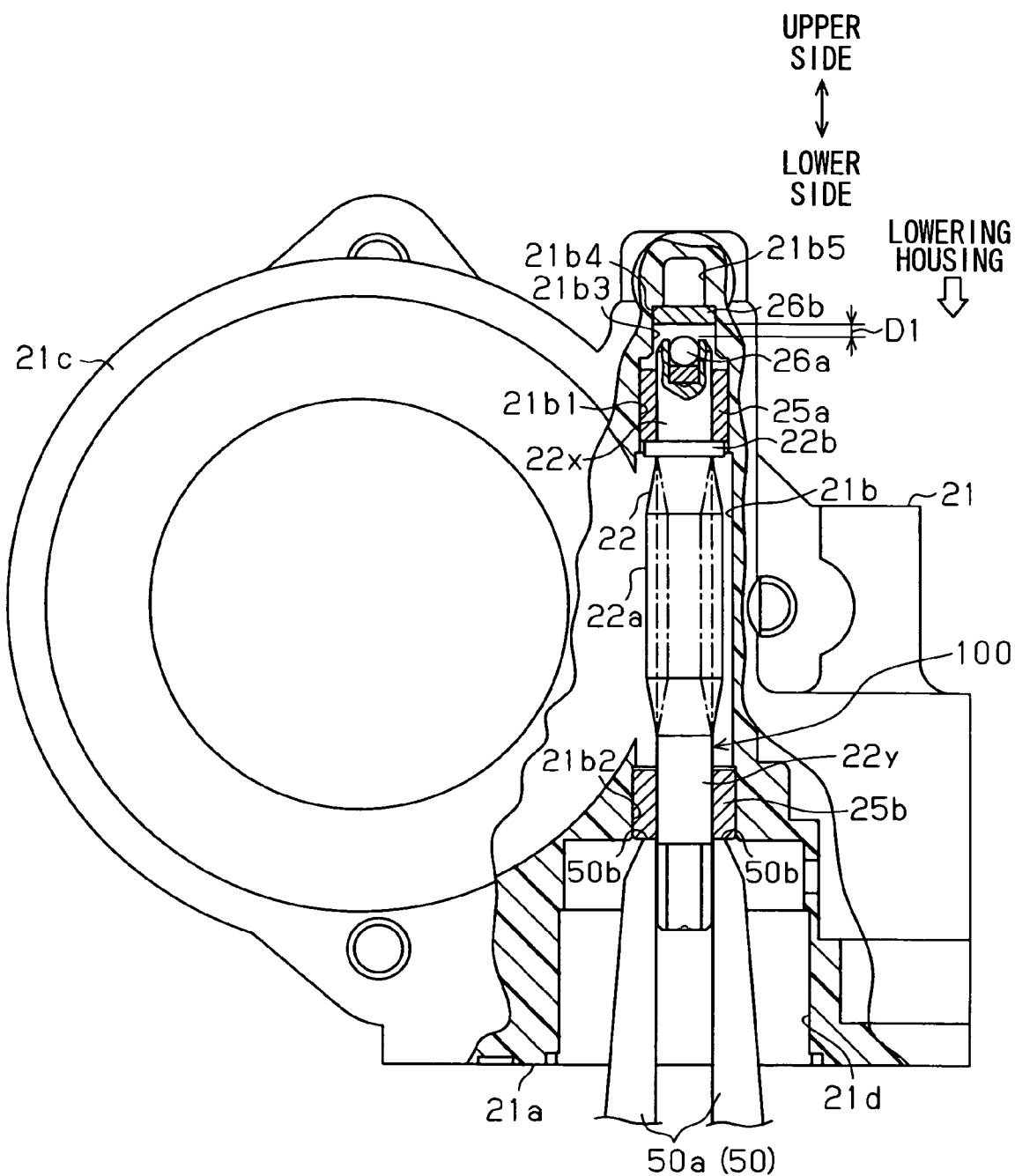
FIG. 3 is another schematic view showing the assembling method of the worm shaft of the motor according to the embodiment.

Next, as shown in FIG. 3, when a predetermined gap D1 is formed between the thrust receiving ball 26a, which is preinstalled to the distal end portion of the worm shaft 22, and the thrust receiving plate 26b upon completion of the lowering of the gear housing 21 to the predetermined lower end position, the installation of the worm shaft 22 into the shaft receiving tubular portion 21b and the press fitting of the bearings 25a, 25b into the installation parts 21b1, 21b2, respectively. The gap D1 is provided as a thrust adjusting gap for the filling process of the thrust adjusting resin 27 described later.

Thereafter, the gear housing 21 is supported such that the opening 21a of the gear housing 21 is oriented upward (thereby orienting the distal end portion of the worm shaft 22 downward), and the motor main body 2 is assembled to the gear housing 21 such that the brake mechanism 30 is interposed between the proximal end portion of the worm shaft 22 and the distal end portion of the motor shaft 10.

Figure 4:
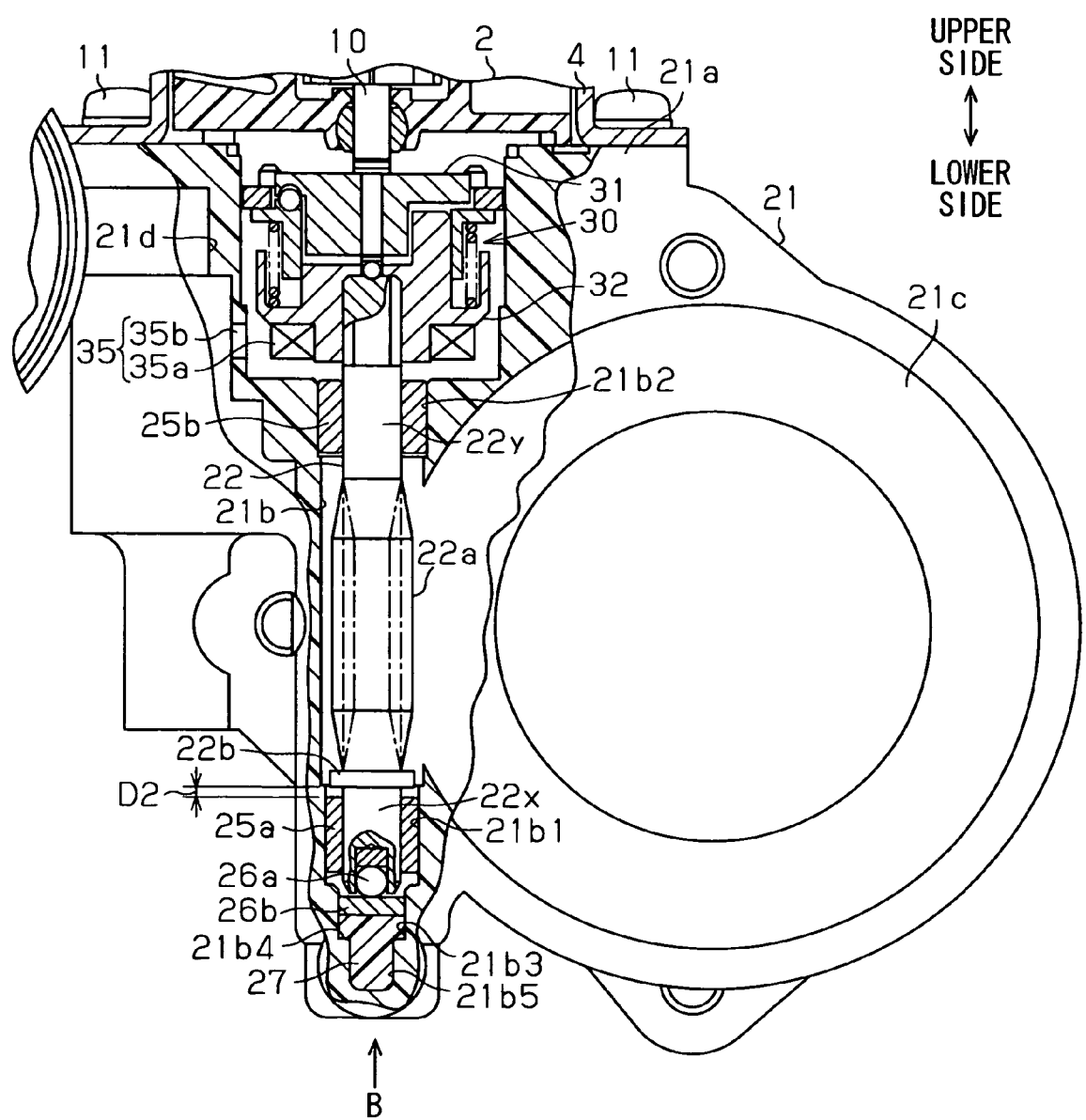
FIG. 4 is a further schematic view showing the assembling method of the worm shaft of the motor according to the embodiment.

Then, as shown in FIG. 4, the thrust adjusting resin 27 in the unsolidified state is filled from the outside into the resin fill chamber 21b5 at the distal end part of the shaft receiving tubular portion 21b through a filler hole (not shown) formed to radially extend through the wall of the shaft receiving tubular portion 21b, so that the thrust receiving plate 26b is pushed, i.e., is lifted upward (toward the motor main body 2 side) in an opposite direction B, which is opposite from the inserting direction F, by the filled resin (the resin being solidified thereafter). Thereby, the thrust adjustment is implemented to reduce the rattling movement (play) of the worm shaft 22, the brake mechanism 30 and the motor shaft 10 in the thrust direction. When the worm shaft 22 is moved upward in the opposite direction B, which is opposite from the inserting direction F, together with the thrust receiving plate 26b, a gap D2 is formed between the distal side bearing 25a and the pressing and supporting element 22b of the worm shaft 22. Thereby, at the time of rotating the worm shaft 22, the sliding between the pressing and supporting element 22b and the bearing 25a is limited or avoided.

Next, advantages of the present embodiment will be described.

(1) In the present embodiment, the pressing and supporting elements 22b, 50b are provided at the worm shaft 22 and the clamping arms 50a of the jig 50 to support the bearings 25a, 25b, respectively, (the bearings 25a, 25b being engaged with the pressing and supporting elements 22b, 50b in the direction opposite from the inserting direction F of the worm shaft 22). Here, at the earlier step, the bearings 25a, 25b are supported by the pressing and supporting elements 22b, 50b, and the worm shaft 22 is supported by the clamping arms 50a of the jig 50. Then, at the following step, the worm shaft 22 is inserted into the gear housing 21 while the bearings 25a, 25b are supported on the worm shaft 22. At the time of inserting the worm shaft 22 into the gear housing 21, the pressing and supporting elements 22b, 50b press the bearings 25a, 25b, so that the bearings 25a, 25b are press fitted into the installation parts 21b1, 21b2 in the gear housing 21. That is, the worm shaft 22 and the clamping arms 50a of the jig 50 have the pressing and supporting elements 22b, 50b, respectively, which act as the jigs for press fitting the bearings 25a, 25b into the installation parts 21b1, 21b2. Thereby, the bearings 25a, 25 can be installed into the gear housing 21 along with the worm shaft 22. Therefore, the number of the assembling jigs and the number of assembling steps can be reduced. That is, the number of the jigs used for the assembling of the entire motor 1 and the number of the assembling steps required for the assembling of the entire motor 1 can be reduced.

(2) In the present embodiment, the pressing and supporting element 22b is provided to the worm shaft 22 to support the distal side bearing 25a located at the distal end side in the inserting direction F of the worm shaft 22, and the pressing and supporting elements 50b are provided to the clamping arms 50a of the jig 50 to support the proximal side bearing 25b located at the proximal end side in the inserting direction F of the worm shaft 22. That is, the clamping arms 50a of the jig 50 are not required to extend to the distal end part in the inserting direction F, and thereby the structure of the jig 50 is simplified, and the detachment of the jig 50 after the installation of the worm shaft 22 can be eased.

(3) In the present embodiment, upon completion of the installation of the bearing 25a into the installation part 21b1 in the gear housing 21, there is provided the step of moving the worm shaft 22 in the direction B opposite from the inserting direction F of the worm shaft 22, so that the pressing and supporting element 22b of the worm shaft 22 is spaced from the bearing 25a. Thereby, it is possible to limit or avoid the sliding between the pressing and supporting element 22b of the worm shaft 22 and the bearing 25a when the worm shaft 22 is rotated.

(4) In the present embodiment, the pressing and supporting element 22b, which supports the bearing 25a at the time of assembling, is formed integrally in the worm shaft 22. Thus, it is possible to limit an increase in the number of components of the motor 1.

The present embodiment may be modified as follows.

In the above embodiment, the gear housing 21 is lowered to install the worm shaft 22 into the gear housing 21. Alternatively, the worm shaft 22 may be lifted to install the worm shaft 22 into the gear housing 21. Furthermore, both of the gear housing 21 and the worm shaft 22 may be moved toward each other to install the worm shaft 22 into the gear housing 21.

In the above embodiment, the thrust adjustment of the worm shaft 22 is executed by filling the thrust adjusting resin 27 into the resin fill chamber 21b5. Alternatively, for example, the thrust adjustment of the worm shaft 22 may be executed by using a screw, which is screwed into the gear housing 21 (the distal end of the shaft receiving tubular portion 21b).

In the above embodiment, the pressing and supporting element 22b is formed integrally in the worm shaft 22. Alternatively, the pressing and supporting element 22b may be formed separately from the worm shaft 22 and may be thereafter integrally assembled to the worm shaft 22.

In the above embodiment, the pressing and supporting element 22b is configured into the annular shape. Alternatively, the pressing and supporting element 22b may be configured into any other appropriate shape, which projects radially outward from the worm shaft 22. In such a case, it is desirable that the shape of the pressing and supporting element 22b is selected to apply the pressing force to the bearing while the pressing force is well balanced in the circumferential direction.

In the above embodiment, the above assembling method is applied to both of the bearings 25a, 25b, which support the worm shaft 22. Alternatively, the above assembling method may be applied to only one of the bearings 25a, 25b.

In the above embodiment, the worm shaft 22 and the motor shaft 10 are connected through the brake mechanism 30 to transmit the rotation therebetween. Alternatively, for example, the brake mechanism 30 may be eliminated, and the motor shaft 10 and the worm shaft 22 may be formed integrally (i.e., connected together) as a single rotatable shaft. The above assembling method may be applied to this rotatable shaft.

In the above embodiment, the above assembling method is applied for the assembling of the worm shaft 22 to the gear housing 21 of the motor 1. Alternatively, the above assembling method may be applied to any other appropriate device other than the motor. In such a case, the number of the bearings is not limited to two. For example, the above assembling method may be applied to the case where the number of the bearing(s) is one or alternatively three or more.

Additional advantages and modifications will readily occur to those skilled in the art. The invention in its broader terms is therefore not limited to the specific details, representative apparatus, and illustrative examples shown and described.

What is claimed is:

1. A rotatable shaft assembling method comprising:
installing at least one plain bearing over a rotatable shaft; and
inserting the rotatable shaft together with the at least one plain bearing into a housing in a predetermined inserting direction, which is generally parallel to an axial direction of the rotatable shaft, such that the at least one plain bearing is respectively press fitted into at least one installation part of the housing,
wherein:
the inserting of the rotatable shaft includes moving at least one pressing and supporting element, which is provided in at least one of the rotatable shaft and an assembling jig, in the predetermined inserting direction to respectively press fit the at least one plain bearing into the at least one installation part of the housing;

the installing of the at least one plain bearing over the rotatable shaft includes installing one of the at least one plain bearing to an end portion of the rotatable shaft, which is located at a front side of the rotatable shaft in the predetermined inserting direction; and the moving of the at least one pressing and supporting element includes moving one of the at least one pressing and supporting element, which is provided in the rotatable shaft, in the predetermined inserting direction to press fit the plain bearing, which is installed to the end portion of the rotatable shaft, into one of the at least one installation part of the housing, further comprising:

moving the rotatable shaft in an opposite direction, which is opposite from the predetermined inserting direction, to provide a gap between the plain bearing, which is installed to the end portion of the rotatable shaft, and the pressing and supporting element, which is provided in the rotatable shaft, after the moving of the pressing and supporting element, which is provided in the rotatable shaft, in the predetermined inserting direction, wherein the moving of the rotatable shaft in the opposite direction includes applying an axial force to the end portion of the rotatable shaft in the opposite direction.

2. The rotatable shaft assembling method according to claim 1, wherein the applying of the axial force to the end portion of the rotatable shaft includes filling resin in a resin fill chamber of the housing, which is located on a side of the end portion of the rotatable shaft that is opposite from the pressing and supporting element provided in the rotatable shaft in the axial direction to lift the rotatable shaft in the opposite direction.

3. The rotatable shaft assembling method according to claim 1, wherein:

the one of the at least one plain bearing, which is installed to the end portion of the rotatable shaft, is a first plain bearing, and the at least one plain bearing further includes a second plain bearing;

the end portion of the rotatable shaft is a first end portion of the rotatable shaft;

the one of the at least one pressing and supporting element, which is provided in the rotatable shaft, is a first pressing and supporting element, and the at least one pressing and supporting element further includes a second pressing and supporting element;

the one of the at least one installation part of the housing is a first installation part, and the at least one installation part further includes a second installation part;

the installing of the at least one plain bearing over the rotatable shaft further includes installing the second plain bearing to a second end portion of the rotatable shaft, which is opposite from the first end portion; and the moving of the at least one pressing and supporting element further includes moving the second pressing and supporting element, which is provided in the assembling jig, in the predetermined inserting direction to press fit the second plain bearing into the second installation part of the housing.

4. The rotatable shaft assembling method according to claim 1, wherein the rotatable shaft is a shaft that conducts a rotational drive force of an electric motor and is inserted into the housing, which is a motor housing of the electric motor.

5. A rotatable shaft assembling method comprising:

installing at least one plain bearing over a rotatable shaft; and inserting the rotatable shaft together with the at least one plain bearing into a housing in a predetermined inserting direction, which is generally parallel to an axial direction of the rotatable shaft, such that the at least one plain bearing is respectively press fitted into at least one installation part of the housing, wherein:

the inserting of the rotatable shaft includes moving at least one pressing and supporting element, which is provided in at least one of the rotatable shaft and an assembling jig, in the predetermined inserting direction to respectively press fit the at least one plain bearing into the at least one installation part of the housing;

the installing of the at least one plain bearing over the rotatable shaft includes installing one of the at least one plain bearing to an end portion of the rotatable shaft, which is located at a front side of the rotatable shaft in the predetermined inserting direction;

the moving of the at least one pressing and supporting element includes moving one of the at least one pressing and supporting element, which is provided in the rotatable shaft, in the predetermined inserting direction to press fit the plain bearing, which is installed to the end portion of the rotatable shaft, into one of the at least one installation part of the housing;

the one of the at least one plain bearing, which is installed to the end portion of the rotatable shaft, is a first plain bearing, and the at least one plain bearing further includes a second plain bearing;

the end portion of the rotatable shaft is a first end portion of the rotatable shaft;

the one of the at least one pressing and supporting element, which is provided in the rotatable shaft, is a first pressing and supporting element, and the at least one pressing and supporting element further includes a second pressing and supporting element;

the one of the at least one installation part of the housing is a first installation part, and the at least one installation part further includes a second installation part;

the installing of the at least one plain bearing over the rotatable shaft further includes installing the second plain bearing to a second end portion of the rotatable shaft, which is opposite from the first end portion; and the moving of the at least one pressing and supporting element further includes moving the second pressing and supporting element, which is provided in the assembling jig, in the predetermined inserting direction to press fit the second plain bearing into the second installation part of the housing.

* * * * *